United States Patent
Gandhi et al.

(10) Patent No.: US 11,403,074 B1
(45) Date of Patent: Aug. 2, 2022

(54) SYSTEMS AND METHODS FOR GENERATING INTERFACES FOR CALLBACK FUNCTIONS IN OBJECT-ORIENTED CLASSES

(71) Applicant: The MathWorks, Inc., Natick, MA (US)

(72) Inventors: Varun R. Gandhi, Framingham, MA (US); Richard W. Ohman, Ashland, MA (US); Rahul Mitra, Holliston, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 17/035,095

(22) Filed: Sep. 28, 2020

(51) Int. Cl.
*G06F 8/30* (2018.01)
*G06F 8/41* (2018.01)
*G06F 9/54* (2006.01)

(52) U.S. Cl.
CPC ............... *G06F 8/315* (2013.01); *G06F 8/42* (2013.01); *G06F 9/542* (2013.01)

(58) Field of Classification Search
CPC ............ G06F 8/315; G06F 8/42; G06F 9/542
See application file for complete search history.

(56) References Cited

U.S. PATENT DOCUMENTS

| | | | |
|---|---|---|---|
| 7,516,447 B2 * | 4/2009 | Marvin | G06F 9/465 717/108 |
| 7,827,527 B1 * | 11/2010 | Chiluvuri | G06F 8/30 717/109 |
| 8,365,144 B1 * | 1/2013 | Webb | G06F 8/38 717/109 |
| 8,392,877 B1 * | 3/2013 | Chiluvuri | G06F 8/36 717/107 |
| 9,170,783 B1 | 10/2015 | Orofino, II | |
| 9,311,111 B2 | 4/2016 | Foti | |
| 9,507,634 B1 | 11/2016 | Shawver et al. | |
| 2003/0167358 A1 * | 9/2003 | Marvin | G06F 9/465 719/328 |
| 2004/0226030 A1 * | 11/2004 | Marvin | G06F 9/541 719/328 |

OTHER PUBLICATIONS

"Adding Widgets-Bokeh 2.1.1 Documentation," Bokeh, Bokeh Contributors, Jun. 2020, pp. 1-7.

(Continued)

*Primary Examiner* — Phillip H Nguyen
(74) *Attorney, Agent, or Firm* — Cesari and McKenna, LLP; Michael R. Reinemann

(57) ABSTRACT

Systems and methods assist programmers in creating object oriented programs by automatically building smart callback functionality into custom created classes. A user may designate an event defined in a custom class. During object initialization, the systems and methods may automatically generate a callback property and may inject it in the class being initialized. The callback property may represent an interface through which callback functions may access the designated event. The systems and methods may apply one or more rules when generating the callback properties to facilitate access to the designated event enforcing naming standards and property behaviors, and provide interrupt, queuing, memory management, object destruction, and other services.

20 Claims, 14 Drawing Sheets

(56) References Cited

OTHER PUBLICATIONS

"Ipywidgets Documentation," Release 7.5.1, <https://jupyter.org>, Jul. 29, 2019, pp. 1-106.
"MATLAB® Object Oriented Programming," R2020a, The MathWorks, Inc., Mar. 2020, pp. 1-684.
"Shiny: Build Custom Input Objects," RStudio Inc., <https://www.rstudio.com>, Jan. 6, 2014, pp. 1-7.
"Traitlets Documentation," Release 5.0.4, The IPython Development Team, Sep. 7, 2020, pp. 1-61.
"Image Acquisition Toolbox™: User's Guide", MATLAB, R2020a, The MathWorks, Inc., Mar. 2020, pp. 1-456.

\* cited by examiner

```
classdef ProgramEvironmentWorker < package.Component events (HasCallbackProperty)
        TaskCompleted
    end methods (Access=protected)
        function obj = ProgramEnvironment(task)
            run(task);

notify(obj,'TaskCompleted')
        end
    end
end
```

FIG. 4

| Event Source Object Name | Event Name | Handle for Callback Function | Allocated Resources |
|---|---|---|---|
| h | ValueChanged | 0h | object references, file handles |
| h | ValueChanged | 1h | sockets, primitive numbers |
| h | TaskCompleted | 11h | memory |
| 2h | UpdateValue | 3h | variables, primitive data types |
| 2h | ButtonClicked | 31h | file handles, sockets |

FIG. 8

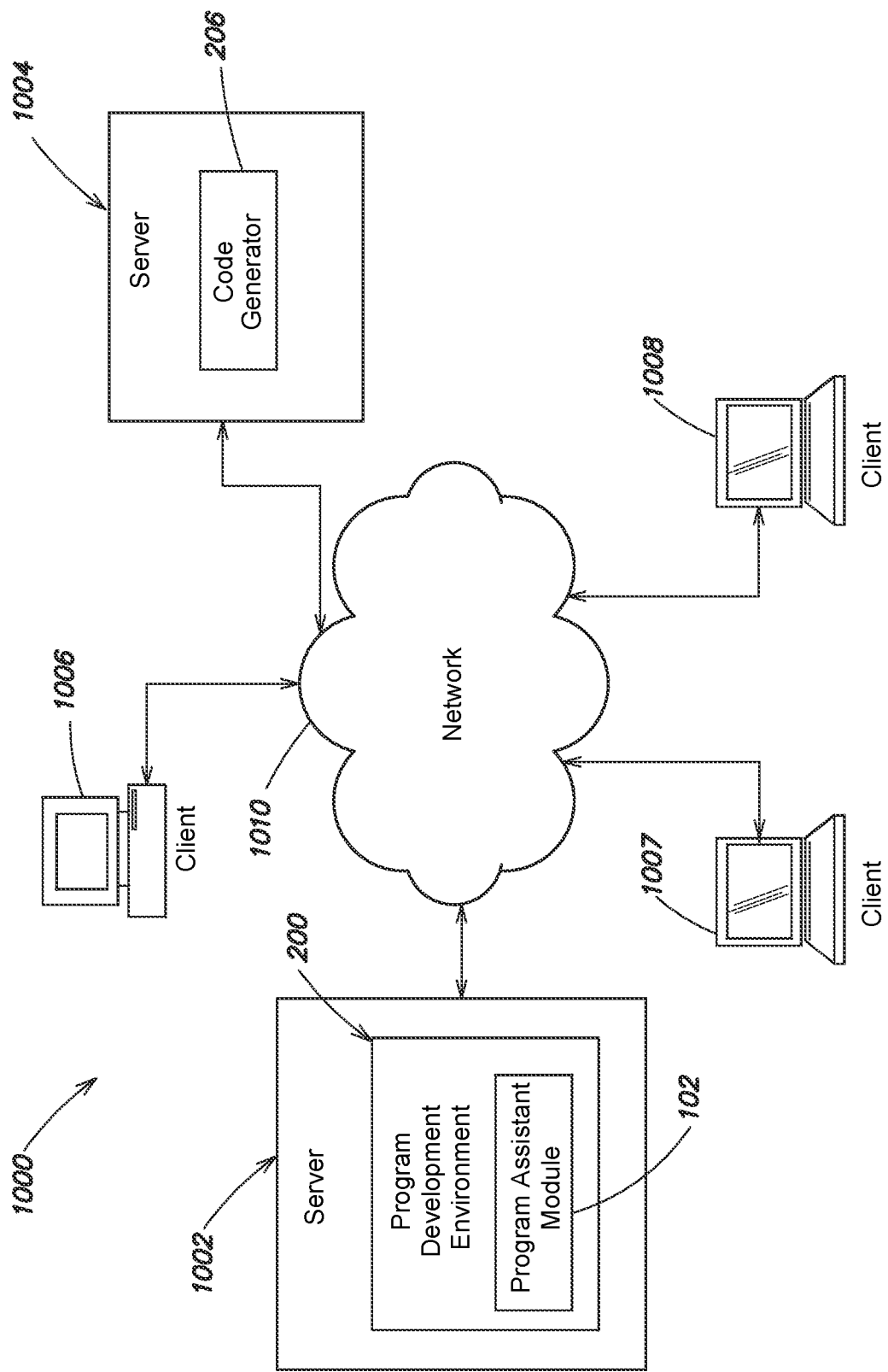

SYSTEMS AND METHODS FOR GENERATING INTERFACES FOR CALLBACK FUNCTIONS IN OBJECT-ORIENTED CLASSES

BRIEF DESCRIPTION OF THE DRAWINGS

The description below refers to the accompanying drawings, of which:

FIG. 4 is an example listing of a program file in accordance with one or more embodiments;

FIG. 8 is a schematic illustration of an example structure of an event listener database in accordance with one or more embodiments;

FIG. 10 is a schematic diagram of an example distributed computing environment in accordance with one or more embodiments.

DETAILED DESCRIPTION OF ILLUSTRATIVE EMBODIMENTS

Figure 1:
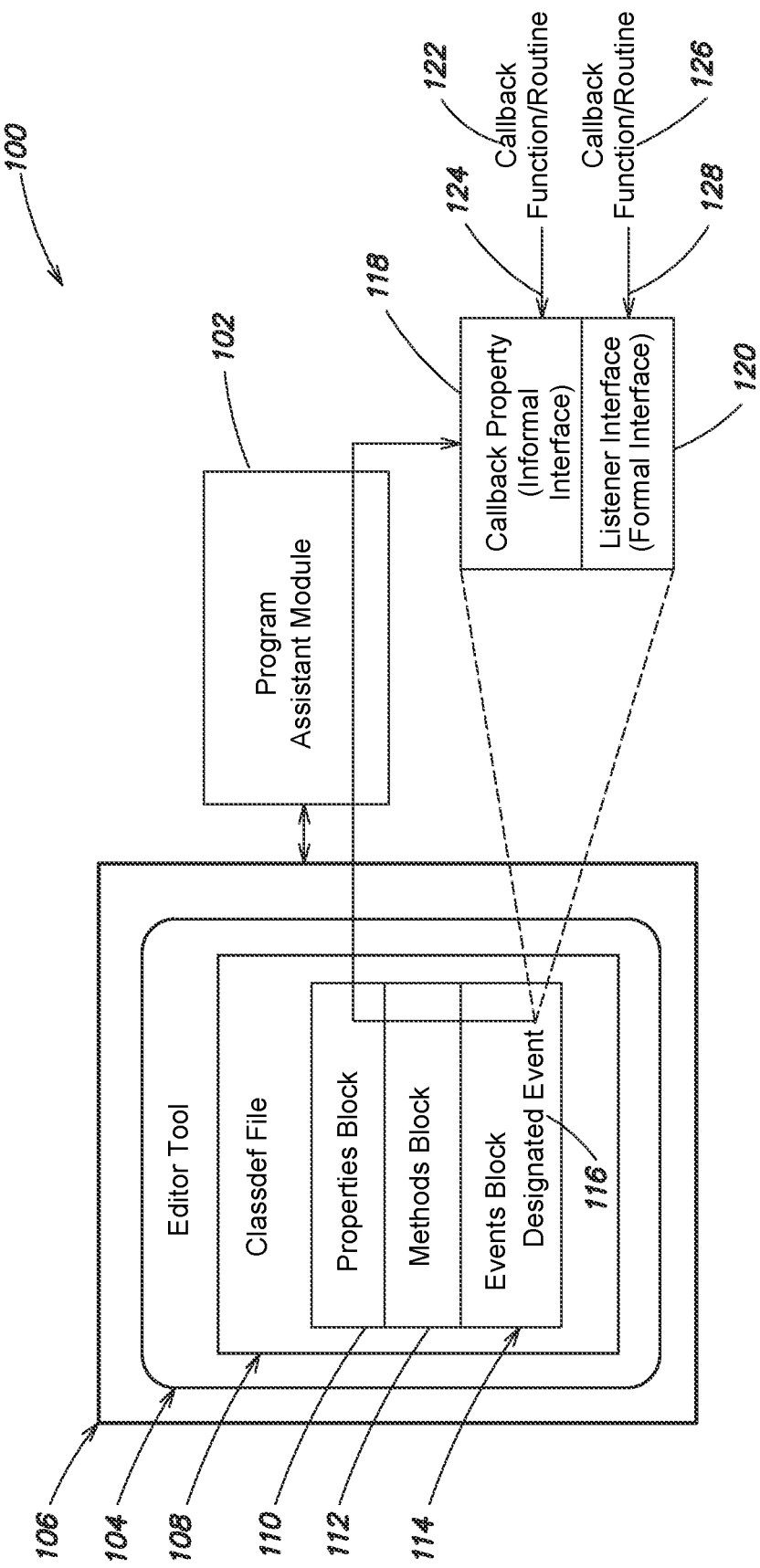
FIG. 1 is a schematic illustration of an example environment in accordance with one or more embodiments.

Textual programming languages are often used by programmers and developers to create computer programs. A program contains a series of instructions written by the developer according to the syntax of the selected programming language. The developer may use an editor, such as a text editor, which may present a window within a graphical user interface for receiving the instructions entered by the developer. The instructions, which constitute the source code of the program, may be saved as a source file. A compiler may translate the source file into object code that may be executed.

A source program created by a developer may include a number of different sections. These sections may be referred to as blocks of code, or simply blocks. A common type of programming language is an object oriented programming language. In an object-oriented programming language, a developer may define objects and interactions among the objects. Objects are specific instances of a class, which describes a set of common characteristics. Objects have behaviors that are common to all objects of a class, and these behaviors are implemented through methods. Each object typically encapsulates data and methods. Objects may interact with each other and with other entities of the object oriented programming language via object interfaces such as function calls and events. Exemplary object oriented programming languages include C++, C#, the MATLAB programming language from The MathWorks, Inc. of Natick, Mass., the Octave language, distributed under the GNU Public License, the MathScript programming system from National Instruments Corp. of Austin, Tex., the SmallTalk programming languages, and the Java programming language from Oracle Corp. of Redwood Shores, Calif., among others.

Integrated Development Environments (IDEs) include tools that help developers write programs in object-oriented programming languages. For example, IDEs or other programming environments may include a source code editor or command window, a compiler and/or interpreter, a debugger, one or more code generators, built-in classes, etc. Exemplary programming environments include the Visual Studio IDE from Microsoft Corp. of Redmond, Wash., the Eclipse IDE from Eclipse Foundation, Inc. of Ottawa Canada, and the MATLAB programming environment from The MathWorks, Inc. of Natick, Mass., among others.

An object oriented program may include a plurality of classes. Each class may be defined within a class definition (classdef) file. Each classdef file defines a class of the program, and may be used to construct an object of that class. Each classdef file may include a plurality of blocks. For example, a classdef file may include properties blocks that contain property definitions, including names and initial values of properties, methods blocks that contain definitions of class methods, and events blocks that define events declared by the class. An event refers to a change or action that occurs within an object, such as the execution of a method, User Interface (UI) events triggered from user interactions, querying or setting a property value, modification of class data, or destruction of an object, etc. A given classdef file may define a subclass, which is a class that is derived from another class known as a base or super class. A subclass inherits properties, methods, and events from the base or super class.

An object oriented programming language may also support the creation of callback functions. A callback function is executable code that can be passed as an argument to other code. For example, a callback function may be passed to an object that may execute (callback) the function at some time, such as in response to the occurrence of an event defined by the object.

During execution of an object oriented program, objects defined by the program may be instantiated. The objects' methods may be performed and their properties may be updated. In addition, events may occur and callback functions may be executed.

A programming language may provide a technique for passing callback functions to objects for execution, e.g., in response to methods, functions, or events defined in classes. For example, in C++, callback functions may be implemented using function pointers, function objects, and lambda functions. In Javascript, a function, the callback function, may be passed as a parameter to another function. The other function then includes a call to the callback function. Techniques for using callback functions, however, may be complex, making it unsuited for use by novice or casual programmers who may not be highly skilled in the programming language. Accordingly, a developer writing code defining a new class, e.g., a class author, may try and provide a convenient way for such novice or casual programmers to pass callback functions to objects instantiated from the class and/or associate callback functions with events defined in the class. Doing so, however, can inadvertently introduce errors, unintended program behavior, and/or unexpected results. It may also result in memory leaks, which can be difficult to trace and uncover.

The present disclosure relates to systems and methods for assisting developers in creating object oriented programs, for example by automatically generating interfaces to events and other functionality of classes for callback functions. A developer, such as a class author, may create a new class in an object oriented programming language by writing a class definition. In some embodiments, the class author may designate an event or other functionality included in the class definition for which an interface is to be generated for use by a callback function. For example, during object initialization, the systems and methods may determine whether a predefined flag, attribute or other designation is present in the class definition. If so, the systems and methods may automatically generate a callback property and may inject this callback property in an object initialized from the class. The callback property may represent a standardized interface for the programming language through which callback functions may access and/or be associated with the designated events or other functionality of the class.

In some embodiments, the systems and methods may apply one or more rules when generating the callback properties to construct the standardized interface, thus facilitating access to the designated events, especially by casual programmers. For example, the systems and methods may apply a naming convention that may be predefined by the programming environment to the callback properties to identify and distinguish them, e.g., from other properties, to simplify access to the designated events or other functionality and to facilitate debugging. The systems and methods may extend the available formats, e.g., syntax, for specifying the functionality of a callback otherwise provided by the programming environment, e.g., beyond a function handle. The systems and methods may also validate that a given callback function conforms to one of the available formats.

The systems and methods may also provide another interface to the designated events or other functionality that is different from the callback properties. This other interface may not include the naming convention or support the extended formats for callback functions. Accordingly, this other interface may be more suitable for use by advanced programmers than the novice or casual programmers using the callback properties.

The systems and methods may provide memory management services to the callback properties and to the callback functions using either of the interfaces. The systems and methods may also provide interrupt services and/or throttling services to the callback functions using either of the interfaces. The systems and methods may also provide object destruction services to the callback properties and to the callback functions using either of the interfaces. The systems and methods may provide the services through components of the programming environment, alleviating the class author from attempting to provide such services manually, which may introduce bugs or other undesired behavior.

By automatically generating callback properties, the systems and methods of the present disclosure may reduce programming errors, e.g., when a class author attempts to manually provide other interfaces. The systems and methods may also ensure expected behavior of the generated callback properties by users of the class created by the class author. The systems and methods may also eliminate memory leaks, for example by tracking callback functions using either of the interfaces and releasing memory allocated to the callback functions, e.g., when objects instantiated from the class definition are destroyed.

FIG. 1 is a schematic illustration of an example environment 100 in accordance with one or more embodiments. The environment 100 may include a program assistant module 102 interacting with an editor tool 104 presented on a display 106. The editor tool 104 may present at least a portion of textual source file 108, such as a class definition (classdef) file. The classdef file 108 may include a properties block 110, a methods block 112, and an events block 114. The events block 114 may include a designated event indicated at 116. As described herein, the program assistant module 102 may generate a callback property 118, which may represent an informal interface to the designated event 116, e.g., an interface meant for use by novice and/or beginner programmers. The program assistant module 102 may attach the callback property 118 to the designated event 116. The program assistant module 102 may also provide another interface 120, which may be called a listener interface, to the designated event 116. The listener interface 120 may represent a formal interface to the designated event 116, e.g., an interface meant for use by advanced and/or experienced programmers.

Callback functions may be created by users, and these callback functions may be associated with the designated event 116 through the callback property 118 and/or the listener interface 120. For example, a callback function 122 may link to the designated event 116 via the callback property 118, as indicated by arrow 124. For example, the user may associate the callback function 122 with the designated event 116 using the interface provided by the callback property 118. Another callback function 126 may link to the designated event 116 via the listener interface 120, as indicated by arrow 128. For example, the user may associate the callback function 126 with the designated event 116 using the listener interface 120. The callback functions 122 and 126 may be included in the classdef file 108 or in other source file(s).

Figure 2:
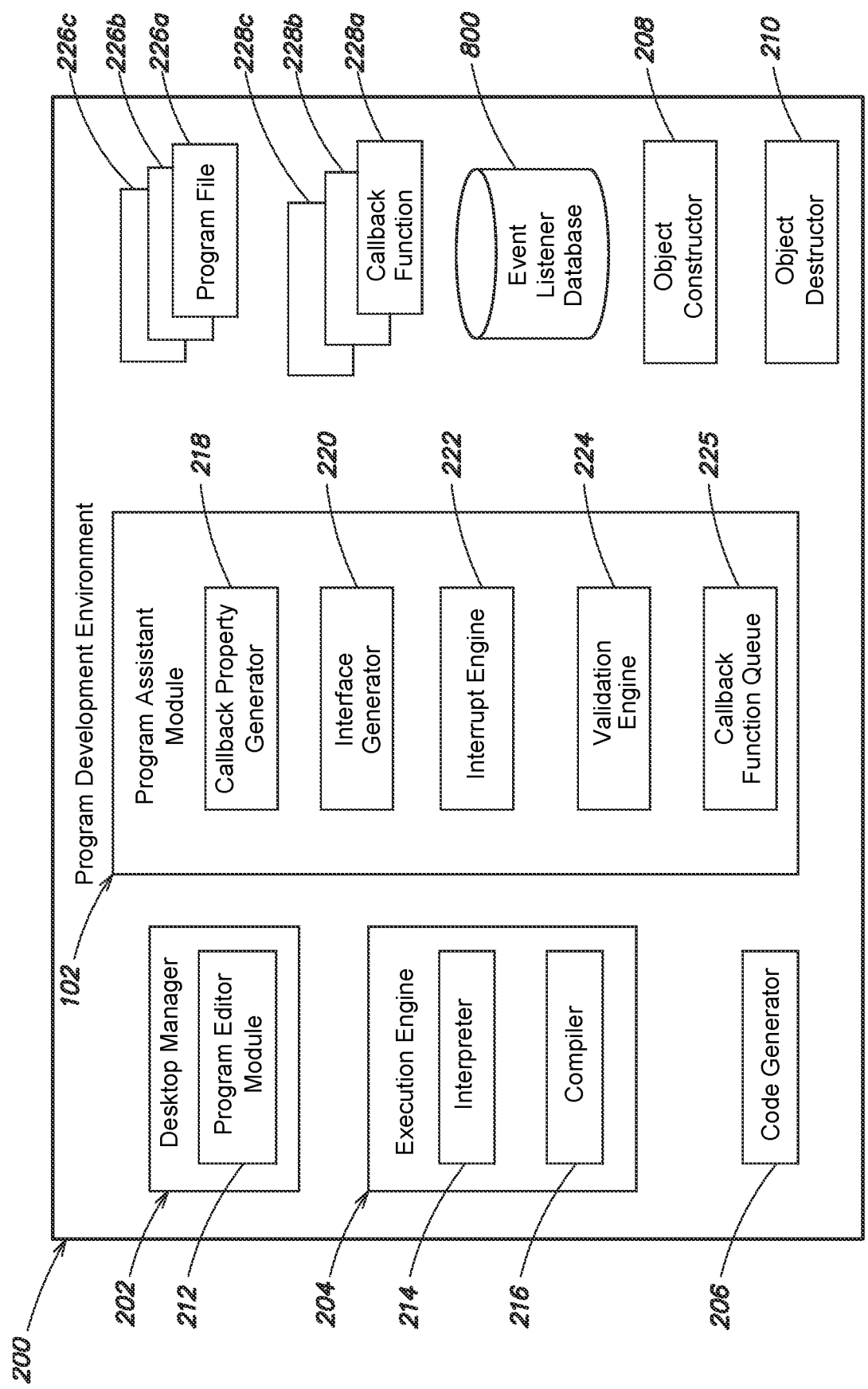
FIG. 2 is a functional diagram of an example program development environment in accordance with one or more embodiments.

FIG. 2 is a functional diagram of an example program development environment 200 in accordance with one or more embodiments. The program development environment 200 may include a desktop manager 202, an execution engine 204, the program assistant module 102, a code generator 206, an object constructor 208 and an object destructor 210. The desktop manager 202 may include a program editor module 212. The desktop manager 202 may generate a graphical user interface in the form of a desktop environment having a plurality of windows for presentation on a display and/or a command window. The program editor module 212 may provide the editor tool 104 as part of the desktop environment. A developer may interact with the editor tool 104 and/or the command window to open a document, such as a source file, or create a new document. The execution engine 204 may include an interpreter 214 and/or a compiler 216. In some embodiments, the compiler 216 may be a just-in-time (JIT) compiler that converts the source program 312 from source code into machine-executable code or virtual-machine executable code. The program assistant module 102 may include one or more components for generating and managing interfaces to events defined in classes, including generating callback properties for one or more classes. For example, the program assistant module 102 may include a callback property generator 218, an interface generator 220, an interrupt engine 222, and a validation engine 224. The program assistant module 102 also may include or have access to a callback function queue 225.

The program development environment 200 also may include or have access to one or more program files, such as program files 226a-c, and to one or more callback functions, such as callback functions 228a-c. In some embodiments, one or more of the callback functions 228 may be included in the program files 226. In some cases, one or more of the callback functions 228 may be enqueued in the queue 225 waiting to be executed. The program development environment 200 also may include or have access to an event listener database 800.

The figures of the present disclosure, including FIG. 2, are provided by way of example. In practice, the present disclosure may be implemented in other ways. For example, the program development environment 200 and/or the program assistant module 102 may take other forms and/or may include additional, fewer, different, or differently arranged components than those shown. The components may also be distributed in different ways and/or among different entities. Additionally, or alternatively, one or more components of the program development environment 200 and/or the program assistant module 102 may perform one or more functions or operations described as being performed by one or more other components of the program development environment 200 and/or the program assistant module 102. For example, the program development environment 200 may further include a debugger, a code verification tool, etc.

The desktop manager 202, the execution engine 204, the program assistant module 102, the code generator 206, the object constructor 208, and the object destructor 210 may be implemented through one or more software modules or libraries containing program instructions that perform the methods described herein, among other methods. The software modules may be stored in one or more memories, such as a main memory, a persistent memory, and/or a computer readable media, of a data processing device, and may be executed by one or more processors. Other computer readable media may also be used to store and execute these program instructions, such as one or more non-transitory computer readable media, including optical, magnetic, or magneto-optical media. In other embodiments, the desktop manager 202, the execution engine 204, the program assistant module 102, the code generator 206, the object constructor 208, and the object destructor 210 or portions thereof may be implemented in hardware, for example through hardware registers and combinational logic configured and arranged to produce sequential logic circuits that implement the methods described herein. In other embodiments, various combinations of software and hardware, including firmware, may be utilized to implement the systems and methods of the present disclosure.

The program files 226a-c, the callback function queue 225, and the event listener database 800 may be implemented through files, tables, trees, or other data structures, and stored on main memory, persistent memory, and/or optical, magnetic, or magneto-optical media, among other storage technologies.

In some embodiments, the program development environment 200 may be used to create programs according to an object oriented programming language.

Some programming languages/environments, such as the MATLAB, Python, and Julia languages/environments are math-oriented, textual languages/environments used in a wide range of scientific, engineering, and other applications. These exemplary languages/environments can provide a number of high-level features that facilitate algorithm development and exploration. For example, the MATLAB language/environment includes dynamic typing, array-based operations, data type inferencing, sample time inferencing, and execution order inferencing, among others.

In some embodiments, a user may run the program development environment 200 on a data processing device, such as a workstation or may access the program development environment 200 on a remote device, e.g., a public or private cloud, from a local device, among other implementations. The program editor module 212 may present the editor tool 104 and/or a command window on a display of the workstation or the local device. The user may open, create, and/or edit a program in the editor tool 104 and/or the command window. The program may be an object-oriented program and may include one or more class definitions. As noted, a class definition may be contained in a distinct portion of code, such as class definition (classdef) file or a classdef block of a program. In addition, a classdef file or block may contain one or more blocks or subblocks, such as properties blocks, methods blocks, events blocks, and/or enumeration blocks, among others. Furthermore, there may be separate blocks for each unique set of attributes associated with the properties, methods and events defined in the classdef file. For example, a first properties block may have an access attribute set to public, and thus define properties to which access is unrestricted, e.g., other parts of the program such as other classes and methods, or other programs, may access these properties. A second properties block may have its access attribute set to protected, and thus define properties that may only be accessed by the code corresponding to the class in which the property is defined or by the code corresponding to those classes that derive from this class. A third properties block may have its access attribute set to private, and thus define properties to which access is restricted to the code for the class in which the property is defined.

The classdef file also may include multiple methods blocks and events blocks having access attributes set to public, protected, and private, among others. The programming language may also support other attributes besides access attributes for properties, methods, and events, and a classdef file may include blocks that define properties, methods and events having such other attributes.

A program file also may be included in a package. A package may be a folder or library of related objects, such as class folders, function files, class definition files, other packages, etc. For example, a graphics package may contain built-in classdef files that create charts and User Interface (UI) components and functions that interface to those components. The names of these classes and functions may be scoped to the package folder or library, such that the names must be unique within the package. The creator of a programming environment may provide a number of predefined, e.g., built-in, packages, for example from which additional classes may be custom created. For example, the MATLAB programming environment includes a graphics package called matlab.graphics.Graphics. A given classdef file may define a subclass from a base or super class in this package. The subclass inherits properties, methods, and events from the base or super class.

When completed by the user, the program file may be compiled and executed, or it may be interpreted for example by the execution engine 204. During execution, the object constructor 208 may construct instances of objects from a classdef file, and the program may invoke or call one or more methods on and update properties of instantiated objects.

Figure 3A:
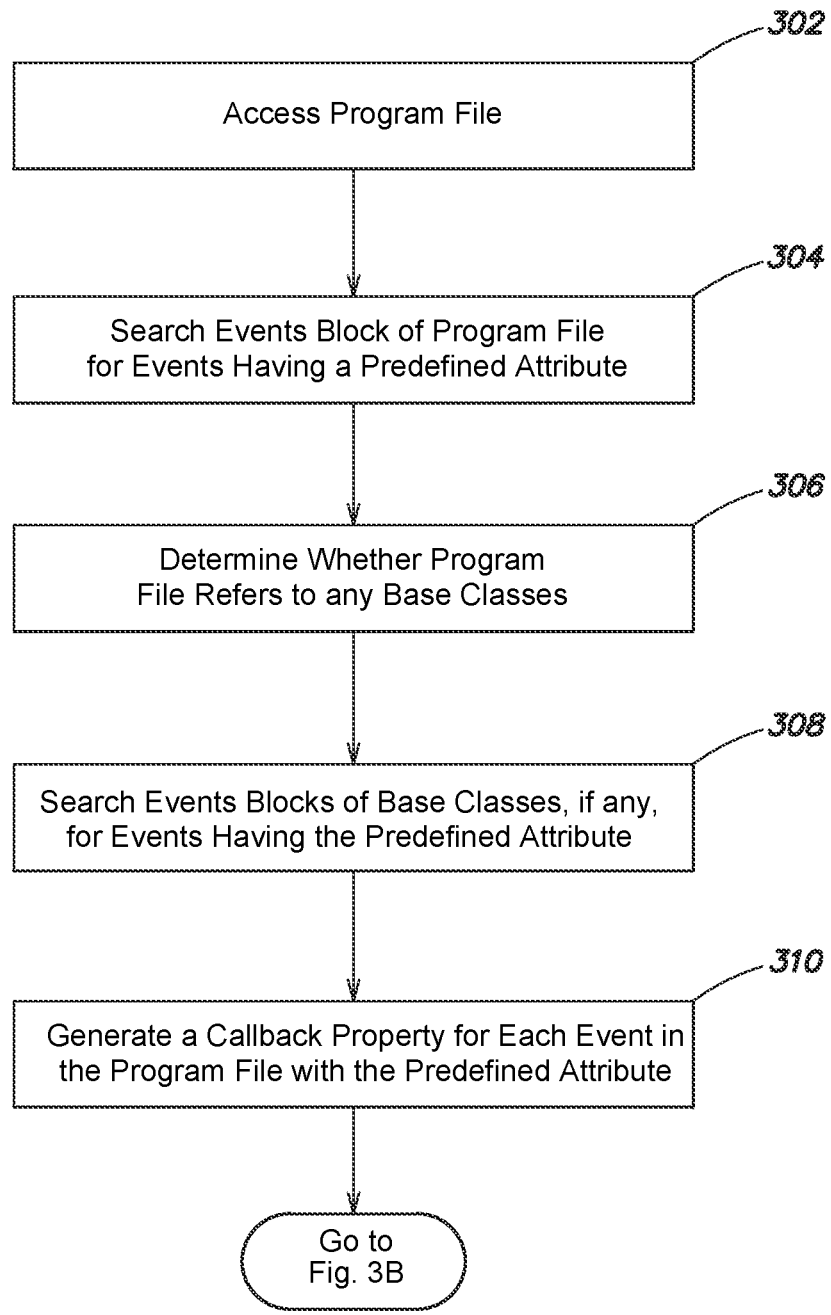
FIGS. 3A-B are partial views of a flow diagram of an example method in accordance with one or more embodiments.
Figure 3B:
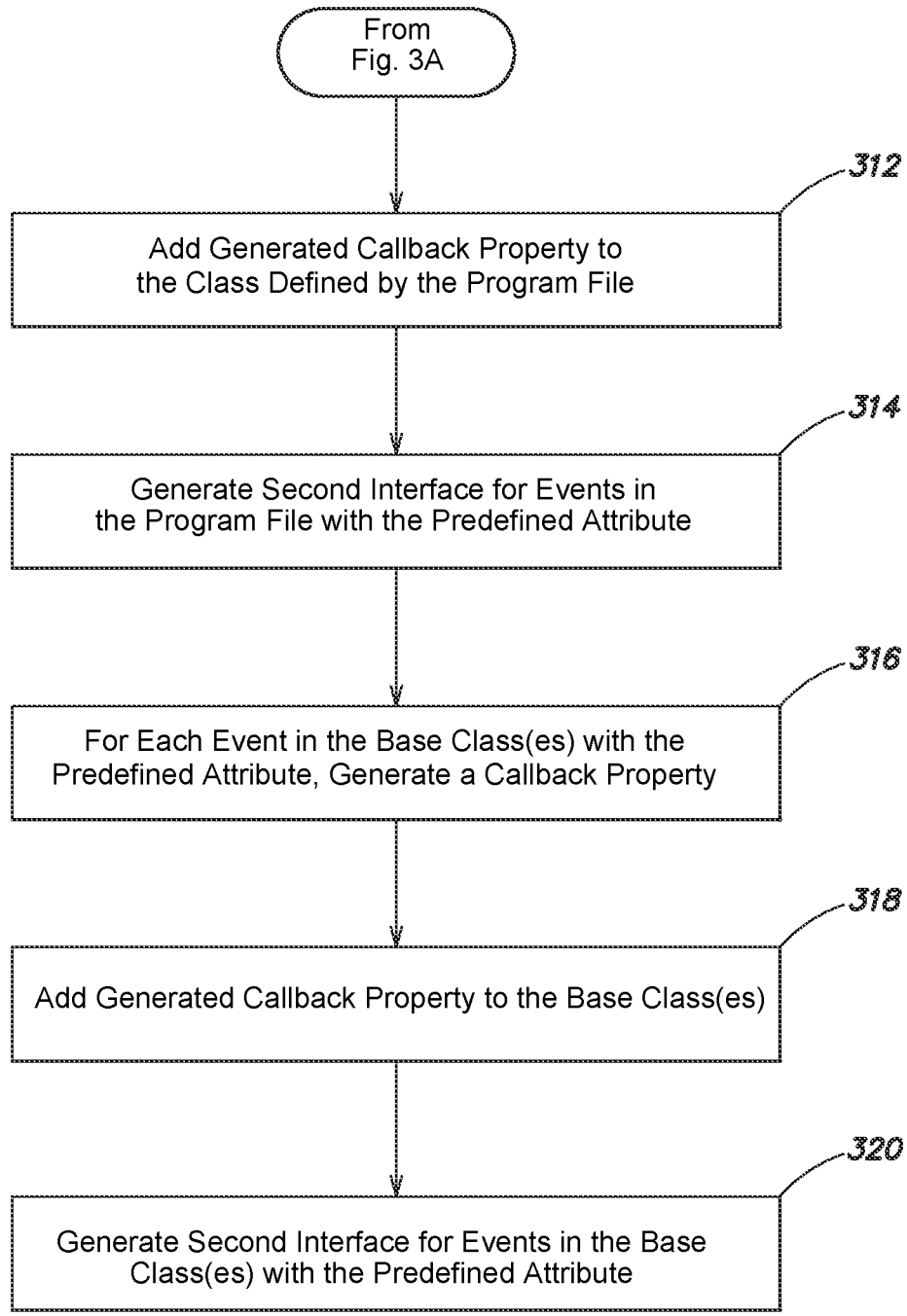

FIGS. 3A-B are partial views of a flow diagram of an example method in accordance with one or more embodiments. The flow diagrams described herein are for illustrative purposes only. In some embodiments, one or more of the illustrated steps may be omitted, additional steps may be added, the order of the illustrated steps may be changed, one or more illustrated steps may be subdivided into multiple steps, multiple illustrated steps may be combined into a single step, and/or one or more portions of the flow diagrams may be separated into multiple, separate and distinct flow diagrams.

During program development and/or execution, the program assistant module 102 may access a program file, as indicated at block 302. For example, the program assistant module 102 may load a program file into memory from persistent storage, e.g., disk storage, and may parse it.

FIG. 4 is an example listing of a program file 400 in accordance with one or more embodiments. The program file 400 may be a custom created class definition (classdef) file created by a class author. The terms custom created or user authored may refer to a classdef file authored by a computer programmer, e.g., a developer, such as a class author, using a program development environment. A custom created classdef file may be contrasted with classdef files created by the entity that created the program development environment 200 and that comes included in the program development environment 200, e.g., as built-in classdef files. In some embodiments, the systems and methods of the present disclosure may be used with built-in classdef files, which may be opened and edited by a developer.

The classdef file 400 may include a subclass entry or line 402 that subclasses the class from a base or super class, i.e., the package.Component package. The classdef file 400 includes an events block 404 that defines an event having a predefined attribute called 'HasCallbackProperty', as indicated by attribute setting 406. As described, this event attribute triggers the automatic generation of a callback property. The events block 404 defines an event named 'TaskCompleted', as indicated at entry 408. The classdef file 400 may define functionality for the class, including functionality determining when the TaskCompleted event is fired, e.g., triggered. For example, the classdef file 400 includes a methods block 410 that defines one or more methods whose access attribute is protected, as indicated by attribute setting entry 412. The methods block 410 defines a function named 'ProgramEnvironment' that performs some task identified as 'task', as indicated at entry 414. The methods block 410 runs this task, as indicated at line 416. The methods block 410 also includes a 'notify' command as indicated at line 418. The 'notify' command may refer to a handle class of the program environment 200 that broadcasts the occurrence of an event to objects that have registered as listeners to that event. The program development environment 200 may utilize a messaging tool to broadcast events. The 'notify' command receives an object named 'obj' and a string 'TaskCompleted' as an input arguments, as indicated at entry 418. The object named 'obj' refers to an object instantiated from the classdef file 400. The 'TaskCompleted' string is the name of the event being broadcast to listeners. In some embodiments, the 'notify' command may receive a third input argument which may be event data that is passed to the listeners along with the handle to the source object, e.g., 'obj'.

In an embodiment, the program file 400 may be opened in the editor tool 104 (or the command windows) presented by the program editor module 212. The editor tool 104 may be one of several program development windows provided by the desktop manager 202. The editor tool 104 may include a plurality of elements, such as a menu bar that includes a plurality of drop down menus, such as File, Edit, etc., each providing one or more commands. For example, using a File→New command, a user may create a new program file in the editor. Using a File→Open command, the user may edit or revise an existing program file. The editor tool 104 also may include a toolbar having a plurality of command buttons or icons that, if selected, perform an operation. In addition, the editor tool 104 may include an editing window or pane in which at least a portion of the program file opened in the editor, e.g., the classdef file 400, FIG. 4 is for illustrative purposes only. It should be understood that an event may be marked or designated in other ways. For example, other attribute names may be used. In some languages, such as the ipywidgets package for Python and Jupyter notebooks or the Bokeh Visualization Library for Python, a custom attribute may be defined whose value can be set to True to designate an event for which a callback property is to be generated, e.g., HasCallbackProperty=True. Alternatively, a property of a binding object may be defined to have a HasCallbackProperty=True, such as in the Shiny package for R.

It should also be understood that other functionality defined in a classdef or other file may be designated. For example, in some embodiments, the program development environment 200 may not even support events. In this case, properties or other functionality may be designated.

Returning to FIG. 3A, the callback property generator 218 may search the events blocks of a program file, such as the program file 400, for events having a predefined attribute, such as an attribute called 'HasCallbackProperty', as indicated at block 304. For example, the callback property generator 218 may be configured to search a program file for the syntax used to identify an events block. In other embodiments, the callback property generator 218 may be configured to search the program file for the designator, e.g., the predefined attribute, which may mark other functionality besides events. The callback property generator 218 may determine whether the program file being analyzed includes any references to any base classes, as indicated at block 306. If so, the callback property generator 218 may search the events blocks of the base class(es) which include the predefined property, i.e., 'HasCallbackProperty', as indicated at block 308.

The callback property generator 218 may identify within the classdef file 400 events blocks with the predefined attribute, e.g., 'HasCallbackProperty'. The callback property generator 218 may determine that the events block 404 includes the predefined attribute. The callback property generator 218 may further determine that the events block 404, which includes the predefined attribute, defines an event named 'TaskCompleted'.

The callback property generator 218 may generate a callback property for each event of the program file that includes the predefined attribute, as indicated at block 310. In some embodiments, the generated callback property may itself be an object. In some embodiments, the callback property may be generated by instantiating an object from a predefined handle class for constructing callback properties. The callback property generator 218 may utilize one or more rules to generate the callback property. For example, the callback property generator 218 may apply a naming rule to name the callback property. An exemplary naming rule is eventName+Fcn. For example, for the 'TaskCompleted' event 408 of the events block 404, the callback property generator 218 may name the callback property 'TaskCompletedFcn'.

The callback property generator 218 may apply a datatype rule that extends the valid datatypes for the value of the generated callback property. For example, instead of limiting the format of the value of the generated callback property to be a function handle, the callback property generator 218 may use the datatype rule to extend the available formats of the value beyond function handles. In some embodiments, the datatype rule may allow that the value of the callback property to be a string, a function handle, or a cell array containing a function handle and one or more input arguments of the function handle. Furthermore, the datatype rule may allow the string to be a command or name of an executable file of the programming language. For example, for the MATLAB programming language, the string could be a MATLAB command, such as 'disp', which is a command to display the value of a variable, or the name of an M-file, which is a text file containing a sequence of MATLAB commands. In some embodiments, the datatype rule may specify that the function referenced by the function handle define at least two input arguments: the handle of the object generating the event and an event data structure.

The callback property generator 218 also may apply an attribute rule for setting the attributes of the callback property. An exemplary attribute rule sets the attributes of the callback property to be non-copyable, no-reset, and dependent. The non-copyable attribute may mean that the value of the generated callback property is not copied when the object instance is being duplicated and copied. The no-reset attribute may prevent the value of the generated callback property from being reset to its default value when a reset function is called on the object. The dependent attribute may mean that the value of the callback property object is not stored in the object, such that get and set functions cannot access the property. The values given to a callback property may be complex. For example, function handles, which can hold references to other objects (via closures), may be given to a callback property. Using the dependent attribute permits more efficient and less error prone managing of memory for storing a callback property.

Once generated, the callback property generator 218 may add the callback property to the program file, as indicated at block 312 (FIG. 3B). For example, the callback property generator 218 may add the TaskCompletedFcn callback property to an in-memory representation of the ProgramEnvironmentWorker classdef file 400 when loaded to memory. The callback property generator 218 may not statically declare the TaskCompletedFcn callback property in the classdef file 400. Accordingly, a user may not see a TaskCompletedFcn callback property when reviewing the classdef file 400.

As described herein, the generated callback property may represent an interface to the backing event. Code, e.g., a callback function, may be assigned through this interface to execute on occurrence of the backing event. For example, a user may associate a callback function with the event using the name generated for the callback property. During execution of a program file, the program assistant module 102 and/or the execution engine 204 may execute the callback function when the event triggers.

In some embodiments, the interface generator 220 may generate another interface, different from the callback property, for the events having the predefined attribute, as indicated at block 314. This other interface may be called a listener interface. For example, the interface generator 220 may provide one or more functions or methods that may be included in a program file. When executed, the one or more functions or methods may register a callback function as a listener to an event or other functionality included in a classdef file. Exemplary functions or methods include the 'listener' and 'addlistener' methods of the MATLAB language/environment. In Python, functions or methods may be bound to events. For example, 'widget.bind(event, handler)' will cause the 'handler' to be called with an object describing the event, if an event matching the 'event' description occurs in the widget.

The callback property generator 218 may also generate a callback property for each event in the base class(es), if any, that includes the predefined attribute, as indicated at block 316. The same rules may be used when generating callback properties to the base class(es), if any. The callback property generator 218 may also add any such callback properties to the base class(es), as indicated at block 318. In some embodiments, the interface generator 220 may create a second interface for the events defined in the base class(es), if any, having the predefined attribute, as indicated at block 320.

A user, which may be the same user that created the classdef file 400 or another user, may write and run code that instantiates an object from the classdef file 400. This user or yet another user may write and run code that utilizes the callback property to assign a callback function to the callback property's backing event. Because the callback property uses a predefined naming convention, this user can access and use the callback property without ambiguity, e.g., without confusing a callback property with some other class property. In addition, because of the attributes assigned to the callback property, the callback property will implement expected behavior from the user's perspective. In addition, the user has a number of options for defining the callback function, e.g., as a function handle, a string, or a cell array, and the manner chosen by the user to define the callback function will be validated. The user need not examine the classdef file to realize the expected behavior of the callback property.

Figure 5A:
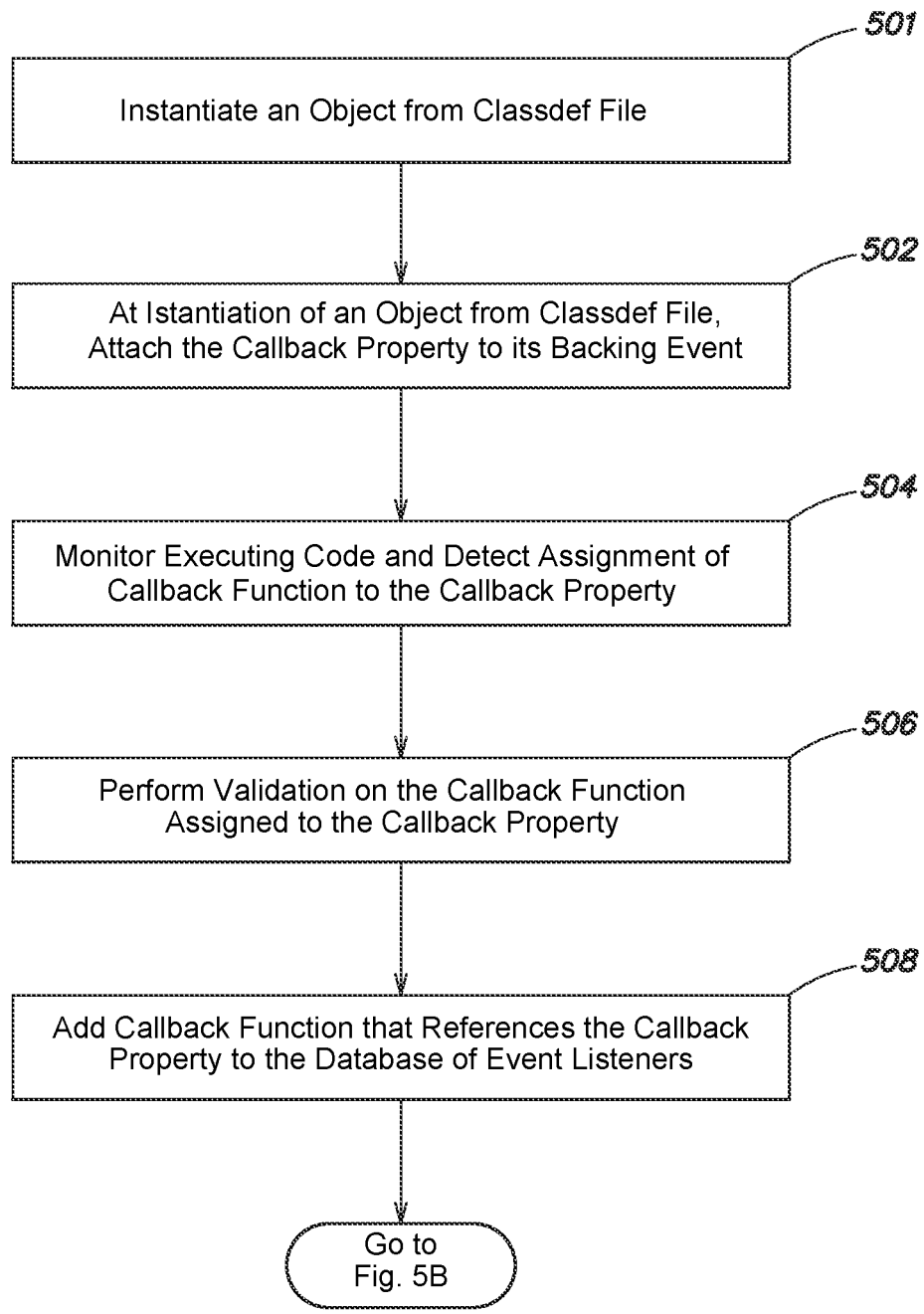
FIGS. 5A-C are partial views of a flow diagram of an example method in accordance with one or more embodiments.
Figure 5B:
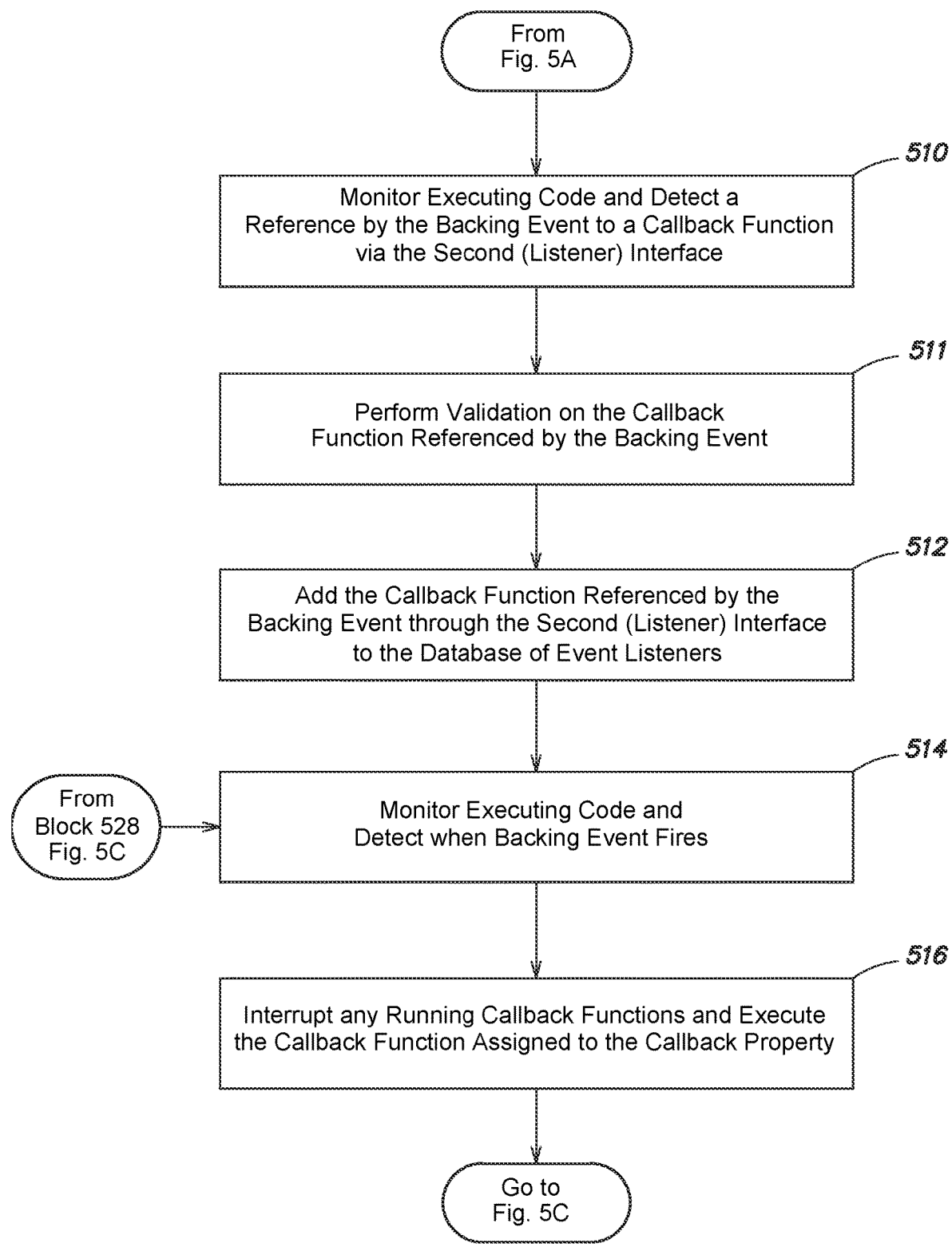
Figure 5C:
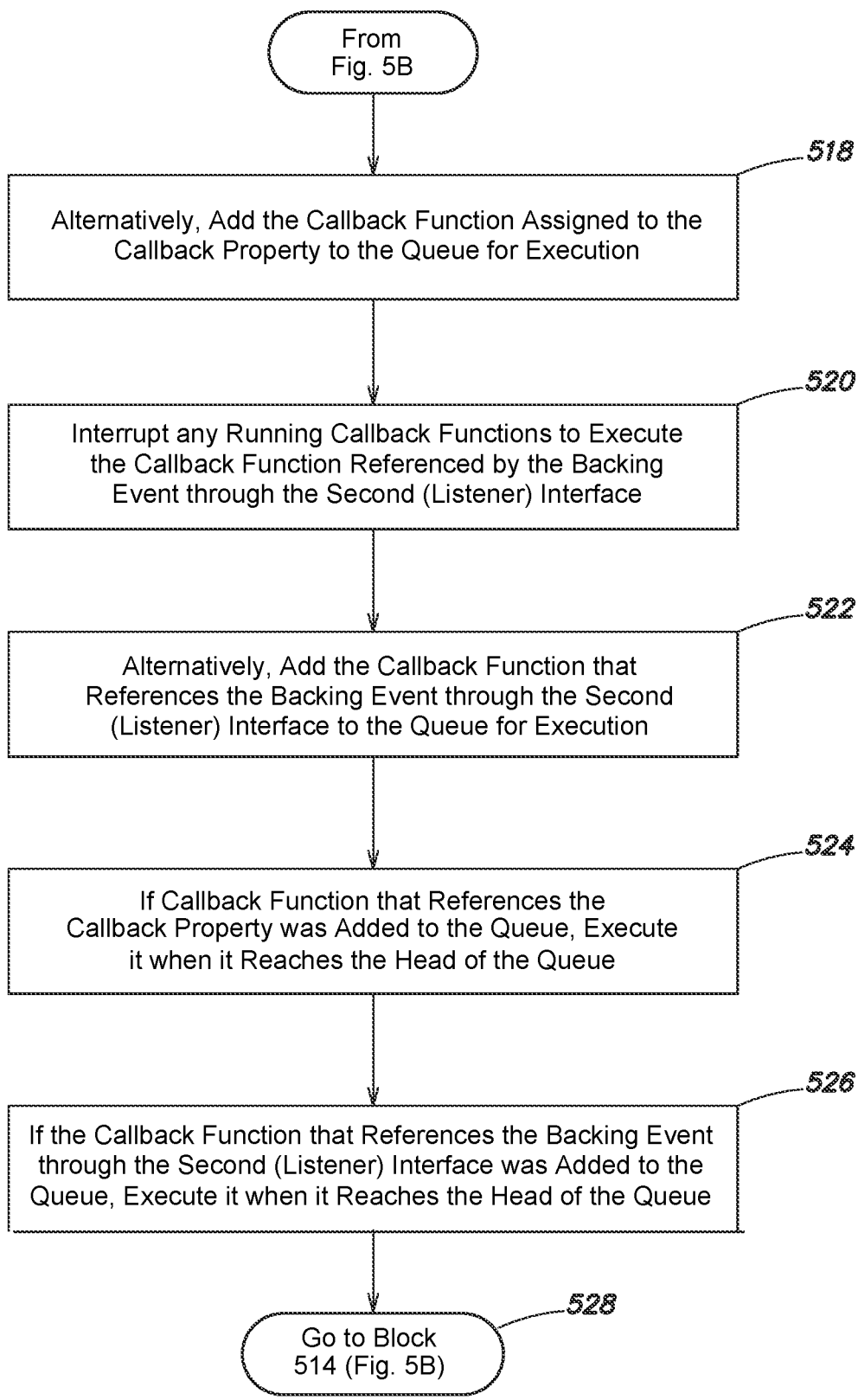

FIGS. 5A-C are partial views of a flow diagram of an example method of using a generated callback property in accordance with one or more embodiments. An object may be instantiated from a classdef file, such as the file 400 (FIG. 4), as indicated at block 501. In object oriented systems, objects are typically created through a process called construction in which initial values may be assigned to properties and/or variables associated with the objects. Object construction may be performed by calling a function often called a constructor. The constructor function may have the same name as the class or may have another name. The call to the constructor may be made using the same syntax as calling an ordinary function or method or may use special syntax or special operators that indicate that a new object is to be constructed. The constructor may take arguments that are used to create an instance having specific property values. This way many objects may be created that share the characteristics defined by their class, but also differ from other instances of the same class.

In response to an object being instantiated from a class to which a callback property was generated, the program assistant module 102 associates, e.g., attaches, the callback property to its associated event, e.g., the callback property's backing event, as indicated at block 502. For example, the callback property generator 218 may create an in-memory listener to the event. The in-memory listener may be created by instantiating an object from a classdef file that defines listener objects. The callback property generator 218 may provide the name of the source object and the name of the event to this listener object. The listener object may execute the callback function associated with the callback property when the backing event is notified. For a classdef with multiple event blocks, a separate listener may be created for each event with the HasCallbackProperty attribute. The program assistant module 102 may monitor code being executed or run and detect an assignment of a callback function to the callback property, as indicated at block 504. The validation engine 224 may perform one or more validation tests on the callback function assigned to the callback property, as indicated at block 506. For example, the validation engine 224 may examine the callback function being assigned and determine whether it is one of:

1. a function handle for a callback function;
2. a cell array containing a function handle and one or more arguments for the function, such as one or more input arguments; or
3. a string that is a valid command or expression in the programming language or is the name of an executable file of the programming language.

If the callback function is one of these, then it passes the validation test, and processing may continue. If the validation engine 224 determines that the callback function is not one of these, then the callback function fails the validation test. In some embodiments, the validation engine 224 may issue a warning and/or suspend further processing. For example, suppose a numeric value, e.g., '123', is assigned to a callback property. The validation engine 224 may present an error message, such as Error setting property 'TaskCompletedFcn' of class 'ProgramEnvironmentWorker'
Callback must be a function handle, a cell array containing a function handle, or a character vector.

Figure 6:
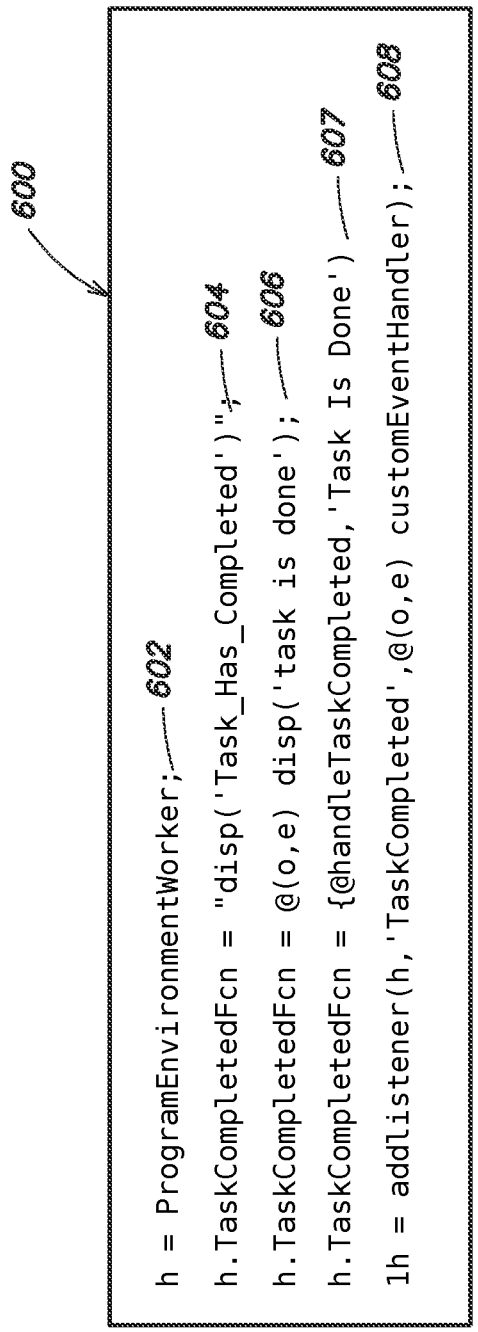
FIG. 6 is a listing of exemplary code in accordance with one or more embodiments.

FIG. 6 is a listing of exemplary code 600 that may be executed or run by the execution engine 204 in accordance with one or more embodiments. A line 602 of the code 600 represents a command directing the object constructor 208 to instantiate a handle object from the ProgramEnvironmentWorker class defined in the classdef file 400 of FIG. 4 and assign it a handle named 'h'. Another line 604 of the code 600 assigns a string to the callback property 'TaskCompletedFcn' of the instantiated handle object named 'h'. The string indicated at line 604 contains a command of the programming language, e.g., 'disp', together with an input argument for the 'disp' command, i.e., 'Task_Has_Completed'. Because the callback function assigned to the callback property is a string that is a valid command, it passes the validation test, and processing may continue. The code 600 further includes a line 606, which represents an alternative to the assignment illustrated at line 604. Instead of assigning a string, the line 606 creates and assigns an anonymous function handle instance of the 'disp' function to the callback property. For example, '(o,e)' are default input parameters for the object and event data, if any. Line 607 of the code 600 represents yet another alternative to lines 604 and 606. Line 607 assigns a cell array to the callback property. The cell array includes a function handle, i.e., '@handleTaskCompleted', and an input argument for the function handle, i.e., 'Task Is Done'. The code 600 further includes a line 608, which is discussed further below.

Returning to FIG. 5A, the program assistant module 102 may add the callback function, i.e., the string 604, to the event listener database 800, as indicated at block 508. The program assistant module 102 may continue to monitor the code being executed and determine whether a reference is made by the backing event to a callback function using the second (listener) interface, as indicated at block 510. The validation engine 224 may perform one or more validation tests on the callback function, as indicated at block 511. For example, the validation engine 224 may determine whether the callback function is a function handle object. If the callback function passes the one or more validation tests, processing may continue. For example, the program assistant module 102 may add the callback function that is referenced by the backing event using the second (listener) interface to the event listener database, as indicated at block 512 (FIG. 5B).

Line 608 (FIG. 6) of the code 600 is a reference to the second (listener) interface generated for the 'TaskCompleted' event defined in the ProgramEnvironmentWorker classdef file 400. Line 608 calls the 'addlistener' method or function of the programming language, which may direct the object constructor 208 to instantiate and returns a listener object and to assign the handle, '1h', to the instantiated listener object. The line 608 further includes arguments for the 'addlistener' method or function. Specifically, the arguments include the handle of the object that contains the event that is being listened to, i.e., 'h' (from line 602), the name of the event, i.e., 'TaskCompleted', the name of the callback function, i.e., '@(o,e) customEventHandler', which creates an anonymous function handle instance of the customEventHandler function where o—is the object that notify is called on, and
e—is event data.

The program assistant module 102 and/or the execution engine 204 may monitor executing code and detect when a backing event for one or more callback functions fires, e.g., occurs, as indicated at block 514. For example, the program assistant module 102 may determine when the notify command of line 418 (FIG. 4) executes, broadcasting the event to the registered listeners. The program assistant module 102 and/or the execution engine 204 may access the event listener database 800 to identify the registered listeners, e.g., the callback functions. The program assistant module 102 and/or the execution engine 204 may execute the callback functions registered as listeners to the event, including callback functions assigned to the callback property and callback functions referenced by the event. In some embodiments, e.g., in single-threaded environments, the interrupt engine 222 may interrupt a running callback function and execute the callback function assigned to the callback property, as indicated at block 516. Alternatively, instead of interrupting a running callback function, the interrupt engine 222 may place the callback function assigned to the callback property in the callback function queue 225 to be executed when it reaches the head of the queue 225, as indicated at block 518 (FIG. 5C). By interrupting and/or queuing callback functions, the interrupt engine 222 may emulate multi-threaded behavior in the single-threaded environment.

The interrupt or queuing action taken by the interrupt engine 222 may depend on attributes of the object with the callback property, e.g., h created at line 602 (FIG. 6), and attributes of the running callback function. For example, in the MATLAB programming language, the values of an 'Interruptible' attribute and a 'BusyAction' attribute determine whether a running callback function can be interrupted by another callback function. If the running callback property can be interrupted, it may be suspended by the interrupt engine 222 and placed in the callback function queue 225. Execution of the (previously) running callback function may be resumed when the interrupting callback function completes. Otherwise, the running callback function may proceed uninterrupted and the interrupt engine 222 may place the callback function assigned to the callback property in the callback function queue 225 for later execution.

In a similar manner, the interrupt engine 222 may interrupt any running callback functions and can execute the callback function referenced by the backing event through the second (listener) interface, as indicated at block 520. Alternatively, the interrupt engine 222 may place the callback function referenced by the backing event through the second interface in the callback function queue 225 for subsequent execution, as indicated at block 522. Again, the particular action taken by the interrupt engine 222 may depend on attributes of the callback function referenced by the backing event through the second (listener) interface and the attributes of the running callback function.

If the callback function assigned to the callback property or the callback function referenced by the backing event through the second (listener) interface was enqueued at the queue 225, then the execution engine 204 may execute that callback function when it reaches the head of the queue 225, as indicated at blocks 524 and 526 (FIG. 5C).

Processing may return to block 514 as indicated by Go To block 528, and the program assistant module 102 may continue to monitor the executing code for additional triggering of the backing event.

As discussed, user may create a program file (and/or enter commands in a command window) that instantiates an object for which a callback property was generated. The user may save the object and share it with another user. For example, the user may call a command of the program development environment 200, such as a store command, on the object. Execution of the store command by the execution engine 204 may create an executable or binary for the object and store the executable in persistent memory, e.g., on disk. For example, the executable or binary may be serialized to disk. The store command may store the object in its current state at the time the store command is called, including all callback functions associated with events or other functionality of the object. The other user may call another command, such as a load command, that may retrieve the executable or binary and load it into memory. The other user may thus utilize the object in another program file (and/or in another command session).

When objects are constructed and are running, they may consume computer system resources such as processor resources, memory, file handles, sockets, handles to devices, slots in tables, other objects, etc. The very existence of objects may also affect how a program or computer system behaves. For example, an object may register one of its methods to be invoked in response to some event from the computer system or another object. Because objects impact their environment through interactions with the computer system and other objects and through the resources they consume, it can be important for a programming environment to also provide a means for objects to be destroyed. Object destruction typically involves the termination of object interactions and the release of computer system and other resources. Generally, program development environments may require that programs be written to explicitly destroy objects, they may automate the destruction process, or they may automate the destruction process under certain circumstances.

Figure 7A:
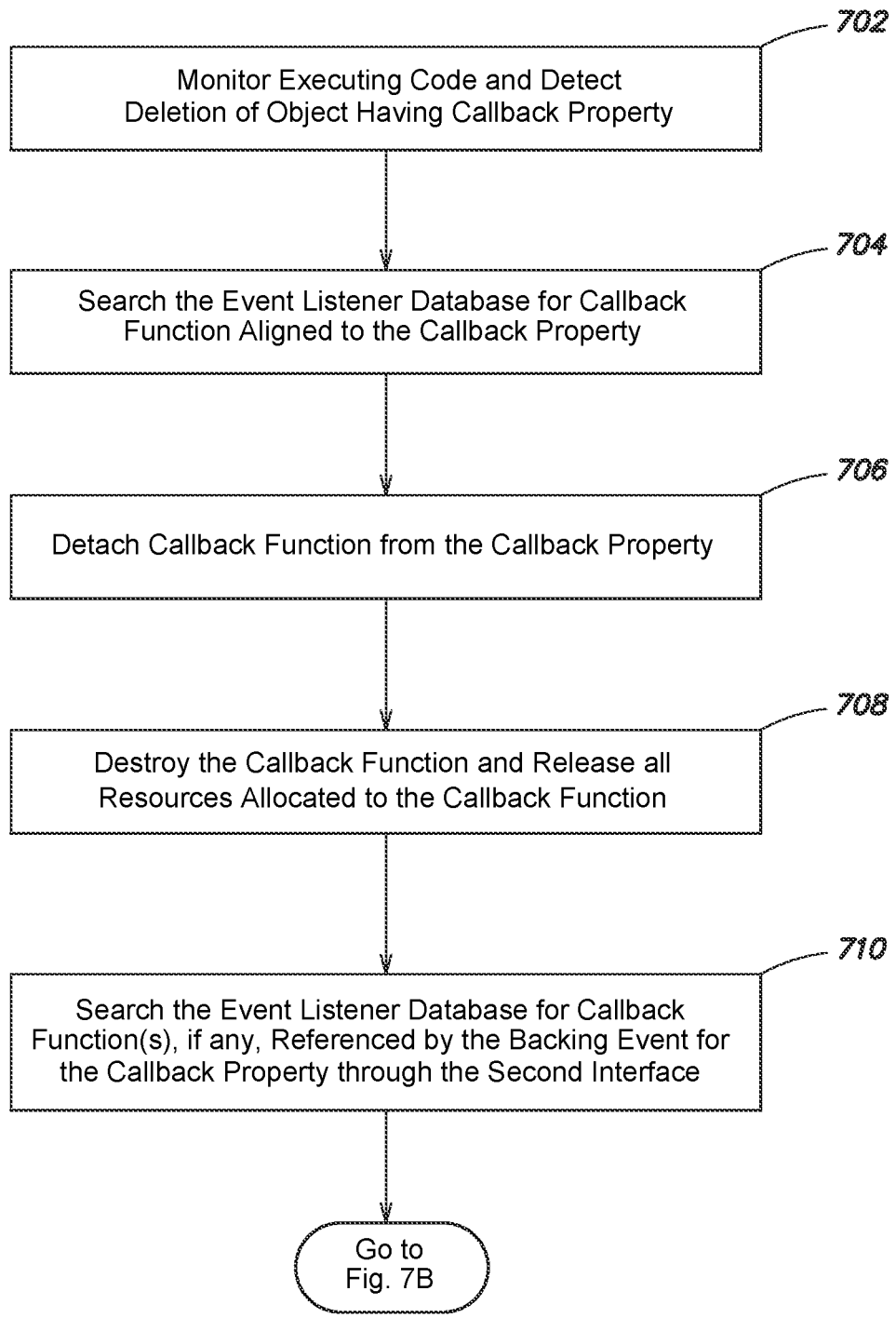
FIGS. 7A-B are partial views of a flow diagram of an example method in accordance with one or more embodiments.
Figure 7B:
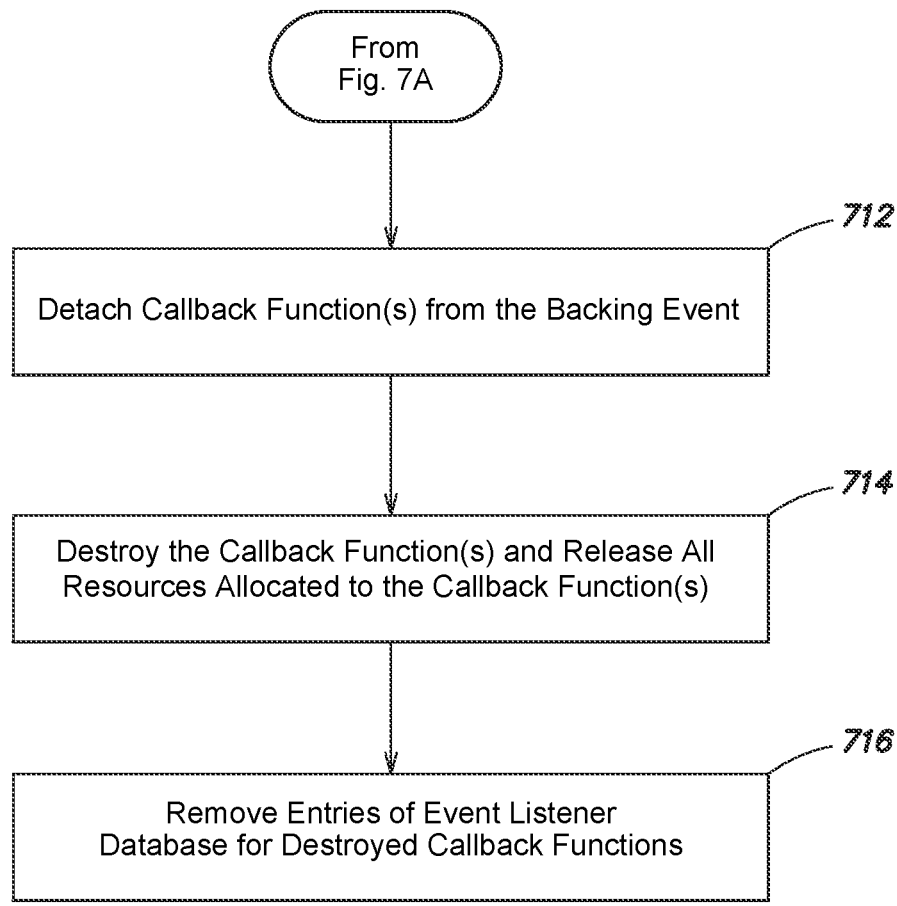

FIGS. 7A-B are partial views of a flow diagram of an example method of destroying callbacks and releasing resources in accordance with one or more embodiments. As described, the program assistant module 102 may automatically add a callback function associated via the callback property with an event or other class functionality to the event listener database 800. When the object defining the event or other functionality is destroyed, the object destructor 210 can utilize the event listener database 800 to identify the callback function, destroy it as well, and release any resources allocated to the callback function, thereby improving the operation of the computer or other device. Destroying an object and/or a callback function may involve the termination of object interactions and the release of system and other resources allocated to the object and/or callback function.

The object destructor 210 may monitor executing code and detect an object that includes a callback property being deleted, as indicated at block 702. The object destructor 210 may search the event listener database 800 for the callback function assigned to the callback property of the object being deleted, as indicated at block 704.

FIG. 8 is a schematic illustration of an example structure of the event listener database 800 in accordance with one or more embodiments. The event listener database 800 may be organized as a table having columns and rows that define cells or records for storing information. For example, the event listener database 800 may include an Event Source Object Name column 802, an Event Name column 804, a Handle for Callback Function column 806, and an Allocated Resources column 808. The event listener database 800 may also include a plurality of rows 810*a-e*. As described, the program assistant module 102 may create an entry in the event listener database 800 in response to a callback function being assigned to a callback property or to a callback property's backing event referencing a callback function via the second (listener) interface. The entries of the event listener database 800 may include information identifying the source object for the event, the event's name, a handle or other identifier of the callback function, and resources allocated to the callback function.

As indicated by the table 800, an object named 'h' may be instantiated from the classdef file 400. The object may define events named 'ValueChanged' and 'TaskCompleted' and callback functions may be registered as listeners to these events as indicated by the information in rows 810*a-c* and column 806. Another object named '2h' may be instantiated from another classdef file, as indicated at rows 810*d* and 810*e*. This other object may define events named 'UpdateValue' and 'ButtonClicked' and other callback functions may be registered as listeners to these events. As indicated by column 808, various resources may be allocated by the program development environment 200 to callback functions, such as object references, file handles, sockets, variables, memory, primitive numbers or datatypes, etc. The program development environment 200 may identify the allocated resources based on requests for resources made by the callback functions to the program development environment 200.

It should be understood that FIG. 8 is meant for illustrative purposes only and that the event listener database 800 may take other forms and/or include different or other information. For example, in some embodiments, a separate event listener database may be created for each object for which there are registered listeners. In this case, the event listener database may not include source object information. In other embodiments, information regarding resources allocated to the source object may be included in the one or more event listener databases. In other embodiments, information regarding resources allocated to callback functions may be incorporated in the information identifying the callback functions.

The object destructor 208 may detach the callback function from the callback property, as indicated at block 706. The object destructor 208 may also destroy the callback function and release the resources that had been allocated to the callback function, as indicated at block 708. For example, the object destructor 208 may look up all of the assigned callbacks for the generated callback properties and unassign them. The object destructor may also destroy/release all the resources that might have been associated with that callback function handle. Thereafter, the object destructor may find the listener handle that was created at block 502 and detach the property and the event, e.g., to ensure proper memory cleanup.

The object destructor 208 may also search the event listener database 800 for callback functions, if any, referenced by the backing event of the callback property through the second (listener) interface, as indicated at block 710. The object destructor 208 may detach such callback functions from the backing event, as indicated at block 712 (FIG. 7B). The object destructor 208 may destroy the callback function and release the resources allocated to the callback function, as indicated at block 714. The object destructor 208 may also clean up the event listener database, for example by deleting the entries for the destroyed callback functions, as indicated at block 716.

Figure 9:
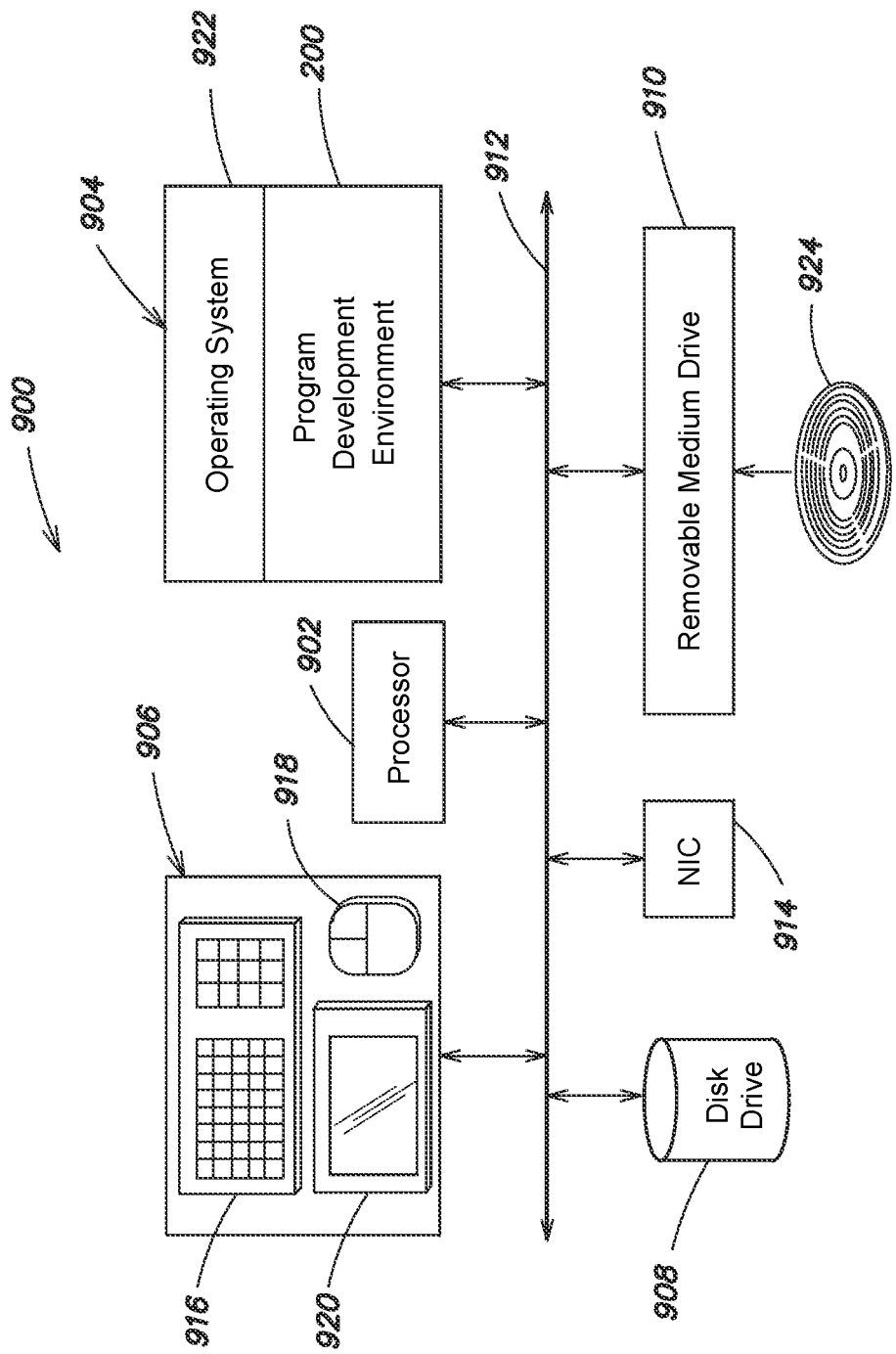
FIG. 9 is a schematic illustration of an example computer or data processing system in accordance with one or more embodiments.

FIG. 9 is a schematic illustration of an example computer or data processing system 900 for implementing one or more embodiments of the present disclosure. The computer system 900 may include one or more processing elements, such as a processor 902, a main memory 904, user input/output (I/O) 906, a persistent data storage unit, such as a disk drive 908, and a removable medium drive 910 that are interconnected by a system bus 912. The computer system 900 may also include a communication unit, such as a network interface card (NIC) 914. The user I/O 906 may include a keyboard 916, a pointing device, such as a mouse 918, and a display 920. Other user I/O 906 components include voice or speech command systems, touchpads and touchscreens, printers, projectors, etc. Exemplary processors include single or multi-core Central Processing Units (CPUs), Graphics Processing Units (GPUs), Field Programmable Gate Arrays (FPGAs), Application Specific Integrated Circuits (ASICs), microprocessors, microcontrollers, etc.

The main memory 904, which may be a Random Access Memory (RAM), may store a plurality of program libraries or modules, such as an operating system 922, and one or more application programs that interface to the operating system 922, such as the program development environment 200.

The removable medium drive 910 may accept and read a computer readable medium 924, such as a CD, DVD, floppy disk, solid state drive, tape, flash memory or other non-transitory medium. The removable medium drive 910 may also write to the computer readable medium 924.

Suitable computer systems include personal computers (PCs), workstations, servers, laptops, tablets, palm computers, smart phones, electronic readers, and other portable computing devices, etc. Nonetheless, those skilled in the art will understand that the computer system 900 of FIG. 9 is intended for illustrative purposes only, and that the present invention may be used with other computer, data processing, or computational systems or devices. The present invention may also be used in a computer network, e.g., client-server, architecture, or a public and/or private cloud computing arrangement. For example, the program development environment 200 may be hosted on one or more cloud servers or devices, and accessed by remote clients through a web portal or an application hosting system, such as the Remote Desktop Connection tool from Microsoft Corp.

Suitable operating systems 922 include the Windows series of operating systems from Microsoft Corp. of Redmond, Wash., the Android and Chrome OS operating systems from Google Inc. of Mountain View, Calif., the Linux operating system, the MAC OS® series of operating systems from Apple Inc. of Cupertino, Calif., and the UNIX® series of operating systems, among others. The operating system 922 may provide services or functions for applications or modules, such as allocating memory, organizing data objects or files according to a file system, prioritizing requests, managing I/O, etc. The operating system 922 may run on a virtual machine, which may be provided by the data processing system 900.

As indicated above, a user, such as a programmer or developer, etc., may utilize one or more input devices, such as the keyboard 916, the mouse 918, and the display 920 to operate the program development environment 200 to create and run programs.

Exemplary program development environments include the MATLAB® programming language from The MathWorks, Inc., the Java programming language, the Julia programming language, the Swift programming language for Apple IOS, the Python programming language, the R programming language, including the R Shiny package for creating web applications in R, the Bokeh Visualization Library for Python, the ipywidgets for Jupyter Notebooks, JupyterLab and IPython, Plotly Dash and other Plotly tools from Plotly of Montreal, Canada, and the Qt widget toolkit.

FIG. 10 is a schematic diagram of an example distributed computing environment 1000 in which systems and/or methods described herein may be implemented in accordance with one or more embodiments. The environment 1000 may include client and server devices, such as two servers 1002 and 1004, and three clients 1006-1008, interconnected by one or more networks, such as network 1010. The devices of the environment 1000 may interconnect via wired connections, wireless connections, or a combination of wired and wireless connections. The servers 1002 and 1004 may include one or more devices capable of receiving, generating, storing, processing, executing, and/or providing information. For example, the servers 1002 and 1004 may include a computing device, such as a server, a desktop computer, a laptop computer, a tablet computer, a handheld computer, or a similar device.

The clients 1006-1008 may be capable of receiving, generating, storing, processing, executing, and/or providing information. Information may include any type of machine-readable information having substantially any format that may be adapted for use, e.g., in one or more networks and/or with one or more devices. The information may include digital information and/or analog information. The information may further be packetized and/or non-packetized. In an embodiment, the clients 1006-1008 may download data and/or code from the servers 1002 and 1004 via the network 1010. In some implementations, the clients 1006-1008 may be desktop computers, workstations, laptop computers, tablet computers, handheld computers, mobile phones (e.g., smart phones, radiotelephones, etc.), electronic readers, or similar devices. In some implementations, the clients 1006-1008 may receive information from and/or transmit information to the servers 1002 and 1004.

The network 1010 may include one or more wired and/or wireless networks. For example, the network 1010 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks. Information may be exchanged between network devices using any network protocol, such as, but not limited to, the Internet Protocol (IP), Asynchronous Transfer Mode (ATM), Synchronous Optical Network (SONET), the User Datagram Protocol (UDP), Institute of Electrical and Electronics Engineers (IEEE) 802.11, etc.

The servers 1002 and 1004 may host applications or processes accessible by the clients 1006-1008. For example, the server 1002 may host the program development environment 200 and/or a programming language, which may include or have access to the program assistant module 102. The server 1004 may include a code generator, such as the code generator 206. The code generator 206 may generate code for one or more of the program files.

Exemplary code generators include, but are not limited to, the MATLAB Coder, the Embedded Coder®, and the HDL Coder™ products from The MathWorks, Inc. of Natick, Mass., and the TargetLink product from dSpace GmbH of Paderborn Germany.

The number of devices and/or networks shown in FIG. 10 is provided as an example. In practice, there may be additional devices and/or networks, fewer devices and/or networks, different devices and/or networks, or differently arranged devices and/or networks than those shown in FIG. 10. Furthermore, two or more devices shown in FIG. 10 may be implemented within a single device, or a single device shown in FIG. 10 may be implemented as multiple, distributed devices. Additionally, one or more of the devices of the distributed computing environment 1000 may perform one or more functions described as being performed by another one or more devices of the environment 1000.

The foregoing description of embodiments is intended to provide illustration and description, but is not intended to be exhaustive or to limit the disclosure to the precise form disclosed. Modifications and variations are possible in light of the above teachings or may be acquired from a practice of the disclosure. For example, while a series of acts has been described above with respect to the flow diagrams, the order of the acts may be modified in other implementations. In addition, the acts, operations, and steps may be performed by additional or other modules or entities, which may be combined or separated to form other modules or entities. Further, non-dependent acts may be performed in parallel. Also, the term "user", as used herein, is intended to be broadly interpreted to include, for example, a computer or data processing system or a human user of a computer or data processing system, unless otherwise stated.

Further, certain embodiments of the disclosure may be implemented as logic that performs one or more functions. This logic may be hardware-based, software-based, or a combination of hardware-based and software-based. Some or all of the logic may be stored in one or more tangible non-transitory computer-readable storage media and may include computer-executable instructions that may be executed by a computer or data processing system, such as system 900. The computer-executable instructions may include instructions that implement one or more embodiments of the disclosure. The tangible non-transitory computer-readable storage media may be volatile or non-volatile and may include, for example, flash memories, dynamic memories, removable disks, and non-removable disks.

No element, act, or instruction used herein should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description has been directed to specific embodiments of the present disclosure. It will be apparent, however, that other variations and modifications may be made to the described embodiments, with the attainment of some or all of their advantages. For example, a generated callback property may be further extended to accept assignments by different and/or other code elements. Therefore, it is the object of the appended claims to cover all such variations and modifications as come within the true spirit and scope of the disclosure.

What is claimed is:

1. A computer-implemented method comprising:
   detecting a user-specified designation associated with an event included in an events block of a textual program;
   in response to the detecting the user-specified designation, generating, by one or more processors, a callback property for the event;
   generating a name for the callback property, wherein the name generated for the callback property conforms to a predefined naming convention usable by a user;
   configuring the callback property to accept an assignment to the callback property, through the name generated for the callback property, by one of (i) a first callback function, (ii) a string representing a command, or (iii) a cell array including a second callback function and an input argument for the second callback function;
   attaching the callback property to the event;
   providing, by the one or more processors, an interface for the event, the interface different than the callback property, the interface configured to receive a reference by the event to a third callback function;
   detecting that the event is triggered; and
   in response to the detecting that the event is triggered, executing, by the one or more processors, at least one of
   (i) the first callback function, the command represented by the string, or the second callback function utilizing the input argument, based on the assignment to the callback property through the name generated for the callback property, or
   (ii) the third callback function.

2. The computer-implemented method of claim 1 further comprising:
   assigning the first callback function, the command represented by the string, or the second callback function to the callback property.

3. The computer-implemented method of claim 2 wherein the assignment is code included in a program file written in a programming language having a syntax, the computer-implemented method further comprising:
   validating that the code is the first callback function, the command represented by the string, or the second callback function according to the syntax of the programming language.

4. The computer-implemented method of claim 1 wherein the user-specified designation is a predefined attribute included in the events block of the textual program.

5. The computer-implemented method of claim 1 wherein the assignment identifies the callback property according to the naming convention.

6. The computer-implemented method of claim 1 wherein the events block of the textual program is included in a class definition (classdef).

7. The computer-implemented method of claim 6 wherein the classdef defines a class and the callback property is a property of the class.

8. The computer-implemented method of claim 1 wherein the attaching the callback property to the event includes configuring the callback property to be a listener to the event.

9. The computer-implemented method of claim 8 wherein the textual program defines a class from which an object is instantiated, the computer-implemented method further comprises:
  adding the listener to a database for the object;
  destroying the object;
  in response to the destroying the object, accessing the database to identify the listener; and
  releasing resources allocated to the listener.

10. The computer-implemented method of claim 1 wherein the textual program defines a class from which an object is instantiated and the callback property has one or more attributes, the computer-implemented method further comprising:
  copying the object;
  resetting the object; and
  setting the one or more attributes of the callback property for the event such that at least one of: (i) a value for the callback property is not copied when the object is copied, (ii) the value for the callback property is not stored in the object, or (iii) the value for the callback property is not returned to a default value when the object is reset.

11. The computer-implemented method of claim 1 wherein the textual program defines a User Interface (UI) component and the event is user-initiated.

12. One or more non-transitory computer-readable media having stored thereon instructions that when executed by a computing device cause the computing device to perform operations comprising:
  detecting a user-specified designation associated with an event included in an events block of a textual program;
  in response to the detecting the user-specified designation, generating a callback property for the event;
  generating a name for the callback property, wherein the name generated for the callback property conforms to a predefined naming convention usable by a user;
  configuring the callback property to accept an assignment to the callback property, using the name generated for the callback property, by one of (i) a first callback function, (ii) a string representing a command, or (iii) a cell array including a second callback function and an input argument for the second callback function;
  attaching the callback property to the event;
  providing an interface for the event, the interface different than the callback property, the interface configured to receive a reference by the event to a third callback function;
  detecting that the event is triggered; and
  in response to the detecting that the event is triggered, executing at least one of
    (i) the first callback function, the command represented by the string, or the second callback function utilizing the input argument, based on the assignment to the callback property using the name for the callback property, or
    (ii) the third callback function.

13. The one or more non-transitory computer-readable media of claim 12 wherein the operations further comprise:
  assigning the first callback function, the command represented by the string, or the second callback function to the callback property.

14. The one or more non-transitory computer-readable media of claim 13 wherein the assignment is code included in a program file written in a programming language having a syntax, the operations further comprising:
  validating that the code is the first callback function, the command represented by the string, or the second callback function according to the syntax of the programming language.

15. The one or more non-transitory computer-readable media of claim 12 wherein the user-specified designation is a predefined attribute included in the events block of the textual program.

16. The one or more non-transitory computer-readable media of claim 12 wherein the attaching the callback property to the event includes configuring the callback property to be a listener to the event.

17. The one or more non-transitory computer-readable media of claim 16 wherein the textual program defines a class from which an object is instantiated, the operations further comprising:
  adding the listener to a database for the object;
  destroying the object;
  in response to the destroying the object, accessing the database to identify the listener; and
  releasing resources allocated to the listener.

18. An apparatus comprising:
  a memory storing a textual program including an events portion; and
  one or more processors configured to:
    detect a user-specified designation associated with an event included in the events portion of the textual program;
    in response to the detecting the user-specified designation, generate a callback property for the event;
    generating a name for the callback property, wherein the name conforms to a naming convention usable by a user;
    configuring the callback property to accept an assignment to the callback property, using the name, by one of (i) a first callback function, (ii) a string representing a command, or (iii) a cell array including a second callback function and an input argument for the second callback function;
    attach the callback property to the event;
    provide an interface for the event, the interface different than the callback property, the interface configured to receive a reference by the event to a third callback function;
    detect that the event is triggered; and
    in response to the detecting that the event is triggered, execute at least one of
      (i) the first callback function, the command represented by the string, or the second callback function utilizing the input argument, based on the assignment to the callback property using the name, or
      (ii) the third callback function.

19. The apparatus of claim 18 wherein the assignment is code included in a program file written in a programming language having a syntax and the one or more processors is further configured to:

assign the first callback function, the command represented by the string, or the second callback function to the callback property; and validate that the code is the first callback function, the command represented by the string, or the second callback function according to the syntax of the programming language.

20. The apparatus of claim 18 wherein the attaching the callback property to the event includes configuring the callback property to be a listener to the event, the textual program defines a class from which an object is instantiated, and the one or more processors is further configured to:

add the listener to a database for the object;

destroy the object;

in response to the destroying the object, access the database to identify the listener; and release resources allocated to the listener.

\* \* \* \* \*